United States Patent [19]

Julstrom

[11] Patent Number: 5,297,210
[45] Date of Patent: Mar. 22, 1994

[54] MICROPHONE ACTUATION CONTROL SYSTEM

[75] Inventor: Stephen D. Julstrom, Chicago, Ill.

[73] Assignee: Shure Brothes, Incorporated, Evanston, Ill.

[21] Appl. No.: 866,747

[22] Filed: Apr. 10, 1992

[51] Int. Cl.⁵ .................... H04B 3/20; H04B 3/00; H04R 3/00; H04M 3/42
[52] U.S. Cl. ........................ 381/66; 381/92; 381/81; 379/206
[58] Field of Search ............ 381/92, 94, 86, 110, 381/66, 81; 379/206, 202

[56] References Cited
U.S. PATENT DOCUMENTS

| | | | |
|---|---|---|---|
| 4,008,376 | 2/1977 | Flanagan et al. | 379/206 |
| 4,600,815 | 7/1986 | Horna | 379/206 |
| 4,658,425 | 4/1987 | Julstrom | 381/81 |
| 4,991,166 | 2/1991 | Julstrom | 379/388 |

Primary Examiner—Jin F. Ng
Assistant Examiner—P. W. Lee
Attorney, Agent, or Firm—Allegretti & Witcoff, Ltd.

[57] ABSTRACT

An improved automatic microphone actuation control system. The system exhibits a high degree of resistance to inappropriate secondary microphone actuation by reverberant sound, even when two or more microphones in a system are operated at significantly different electroacoustic gains. The system further exhibits improved actuation sensitivity to local conference room speech occurring simultaneously with teleconference loudspeaker sound which is strongly coupled acoustically to the microphones. A Reverb Inhibit Bus, which is the maximum of a reduced level speaker inhibit signal and substantially attenuated versions of the DC microphone signal level representations, drives the microphone channels' noise adapting threshold circuitry. Such circuitry is driven in a manner to inhibit microphone actuation for teleconference loudspeaker sound reverberation and reverberation of local conference room speech which has already actuated a microphone. Further, a stronger level speaker inhibit signal is applied to each microphone channel through a direct inhibit bus. This inhibits microphone actuation by directly coupled loudspeaker sound, while not modifying the noise adapting threshold.

14 Claims, 3 Drawing Sheets

MICROPHONE ACTUATION CONTROL SYSTEM

BACKGROUND OF THE INVENTION

The present invention relates generally to microphone control systems and, more particularly, to an enhancement and refinement of the invention of U.S. Pat. No. 4,658,425, issued to Stephen D. Julstrom and entitled "Microphone Actuation Control System Suitable for Teleconference Systems." U.S. Pat. No. 4,658,425 has the same inventor and is owned by the same entity as the present application.

The contents of U.S. Pat. No. 4,658,425 are incorporated herein by reference, as if fully set forth below. For ease of reference, U.S. Pat. No. 4,658,425 is hereinafter referred to simply as "the previous Julstrom patent."

The automatic microphone control referred to pertains to systems with multiple microphones and is suited for use in sound reinforcement, recording, broadcast, teleconference, and other applications. Only the most appropriate microphone or microphones of a multiple microphone conference pickup system are automatically actuated (brought up to full gain) in response to speech originating within the conference room. Microphones which are not, at some moment, the most optimum ones to pick up the conference room speech are not actuated (remain attenuated or turned off). The control system does not allow speech from the far end of a teleconference emitting from a conference room loudspeaker to actuate the conference room microphones.

The major benefits of keeping the minimum number of microphones actuated at any given time are a minimization of the pickup of room noise and reverberation for clearer sound quality and minimization of the pickup of loudspeaker sound for lessened feedback potential in local reinforcement or teleconference applications. This is discussed more fully in the previous Julstrom patent and in "Direction-Sensitive Gating: A New Approach to Automatic Mixing" by Stephen Julstrom and Thomas Tichy, Journal of the Audio Engineering Society, Vol. 32, Nos. 7/8, July 1984, pp. 490–506.

Generally, the objects of the previous Julstrom patent were to actuate only the most appropriate microphone or microphones for one or a plurality of talkers with maximum sensitivity in the presence of varying background room noise, and to inhibit actuation of microphones for teleconference loudspeaker sound with minimal inhibition of desired microphone actuation for locally originating speech. These objects were generally met by the invention of the previous Julstrom patent. However, two problem areas remained.

The initial application of the previous Julstrom invention was in a modular teleconference system where all microphones were operated at the same electroacoustic sensitivity with presumably acoustically similar local surroundings for each microphone in a system. Under these conditions, unwanted actuation of a second microphone by the reverberant "trail" of speech following the proper actuation of a first, more appropriate microphone was adequately inhibited by the action of the MAX bus, as explained in the previous patent. However, when two or more microphones in a system were operated at significantly different gains in a reverberant environment, the MAX bus alone did not always prevent secondary actuation of a microphone with higher electroacoustic gain. (Electroacoustic gain refers here to the combined effects of microphone sensitivity and the following electrical gain.)

Also, while the previous Julstrom invention properly inhibited microphone actuation for teleconference loudspeaker sound, it also tended to excessively inhibit microphone actuation for local conference room speech occurring simultaneously with loudspeaker sound when strong direct acoustical coupling from the loudspeaker to the microphones was present.

SUMMARY OF THE INVENTION

In a principal aspect, the present invention is a microphone system for gating ON, or "actuating" an appropriate microphone. In one embodiment, a microphone may be gated ON, or, alternatively, a trigger signal may be generated, when the microphone is subjected to speech within a room, rather than direct or reverberant loudspeaker sound or the reverberation of speech within the room that has already gated ON a different microphone.

In some embodiments, the system includes one or more microphones, each of which generates an electrical microphone signal, and a gate, for gating ON an associated microphone. The system may further include a loudspeaker in the vicinity of a microphone.

In one embodiment, the invention also includes a monitor, threshold circuit, and comparator. The monitor senses the signal driving the loudspeaker and responsively provides both a direct inhibit signal and a reverberation inhibit signal. The threshold circuit receives a microphone level representation and the reverberation inhibit signal and responsively produces a threshold signal. The comparator compares a scaled signal level representation of the microphone signal with the maximum of both the direct inhibit signal and the threshold signal, using these inputs to generate a trigger signal. The trigger signal may be used elsewhere in the system to, for example, gate ON an appropriate microphone.

In another embodiment, the invention further includes a MAX bus, an additional monitor, and a logic circuit. The MAX bus carries an electrical MAX signal representative of the maximum of the microphone signal amplitudes of the microphone signals at one scaled level for microphones associated with gated ON microphones. The additional monitor compares the scaled amplitude level of each microphone with the MAX signal for generating a decision signal. The logic circuit generates the trigger signal upon receiving both the decision signal and a signal from the comparator.

Therefore, an object of the present invention is an improved automatic microphone actuation system and method. Another object of the present invention is an improved microphone actuation system that substantially maintains the benefits of the previous Julstrom patent, while offering improved performance.

A further object is an automatic microphone activation system and method that exhibit a high degree of resistance to inappropriate secondary microphone actuation by reverberant sound, even when two or more microphones in a system are operated at significantly different electroacoustic gains. Yet still another object is an automatic microphone actuation system and method that exhibit improved actuation sensitivity to local conference room speech occurring simultaneously with teleconference loudspeaker sound which is strongly coupled acoustically to the microphones.

Still another object is an improved microphone system and trigger circuit for issuing a signal which is representative of speech within a room, rather than direct or reverberant loudspeaker sound and/or the reverberation of speech within the room that already has gated on a different microphone. These and other objects, features, and advantages of the present invention are disclosed or apparent in the following detailed description.

BRIEF DESCRIPTION OF THE DRAWINGS

A preferred embodiment of the present invention is described herein with reference to the drawings wherein.

DETAILED DESCRIPTION OF THE PREFERRED EMBODIMENT

Background

The preferred embodiment of the present invention adds important circuit elements to the previous Julstrom patent's preferred embodiment. The present invention is best understood and will be explained in relation to the previous Julstrom patent. Reference should be made to the preferred embodiment of the previous Julstrom patent for a detailed description of the overall system. Significant aspects of the previous Julstrom patent have been modified and enhanced in the present invention, and such modifications and enhancements are described below.

In the previous Julstrom invention, a microphone channel receives an actuation (or "gating") trigger only when it momentarily is providing the maximum DC microphone signal level representation to the MAX bus (which interconnects all the microphone channels) and is "holding it up." (The trigger is also subject to the NAT or Noise Adaptive Threshold criterion.) An already ON (actuated) microphone is given a 6 dB advantage on the MAX bus over the OFF (or attenuated) microphones.

The MAX bus carries the maximum, or "MAX" signal. The MAX signal is the single maximum of all the scaled microphone signal level representations (rectified and filtered versions of the actual microphone signals). The level representation of an ON microphone is scaled up twice (6 dB) compared to an OFF microphone signal level representation.

Figure 1:
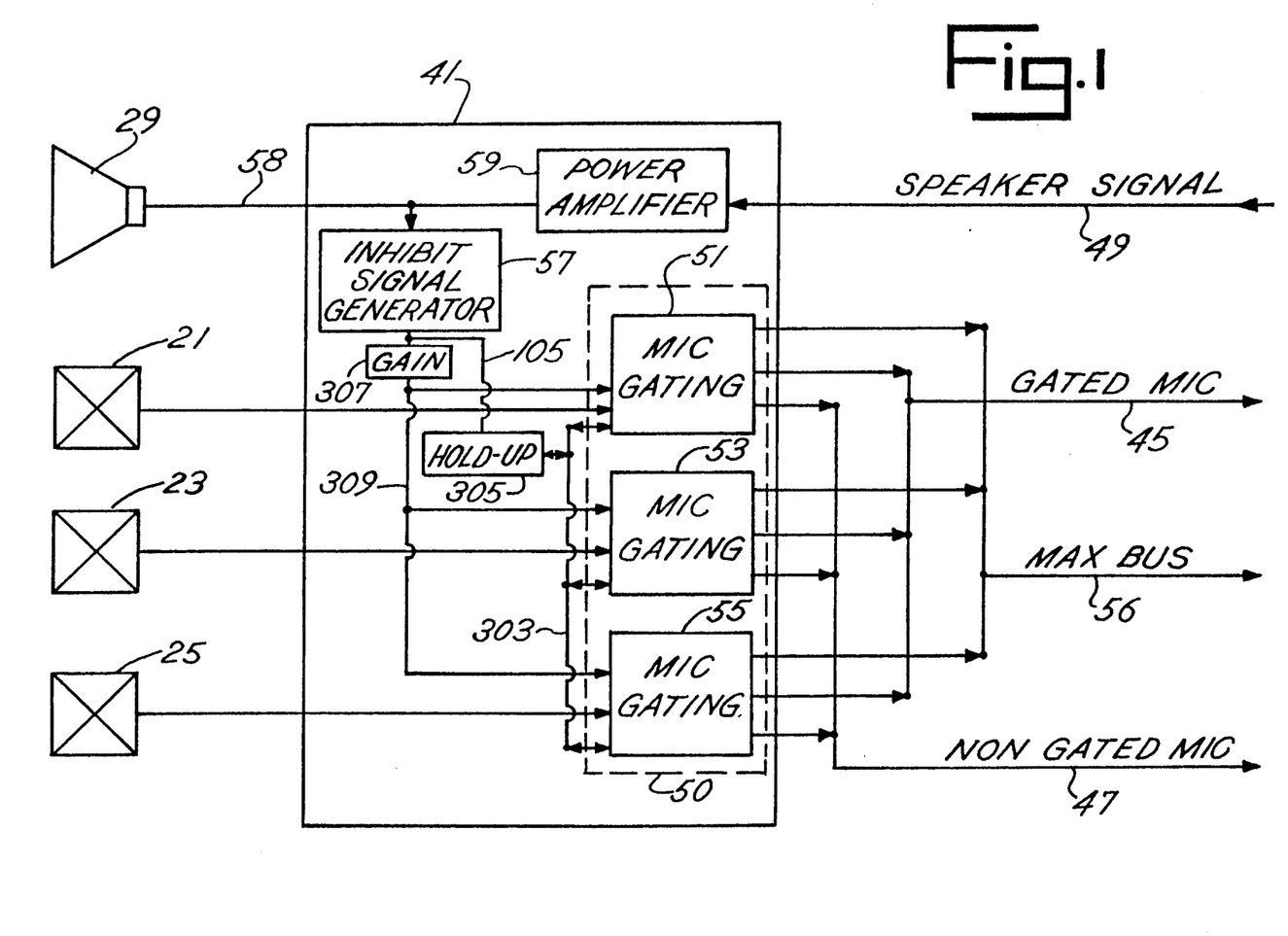
FIG. 1 is a block diagram of the microphone control and loudspeaker drive portion of a teleconference system employing a preferred embodiment of the present invention.
Figure 2:
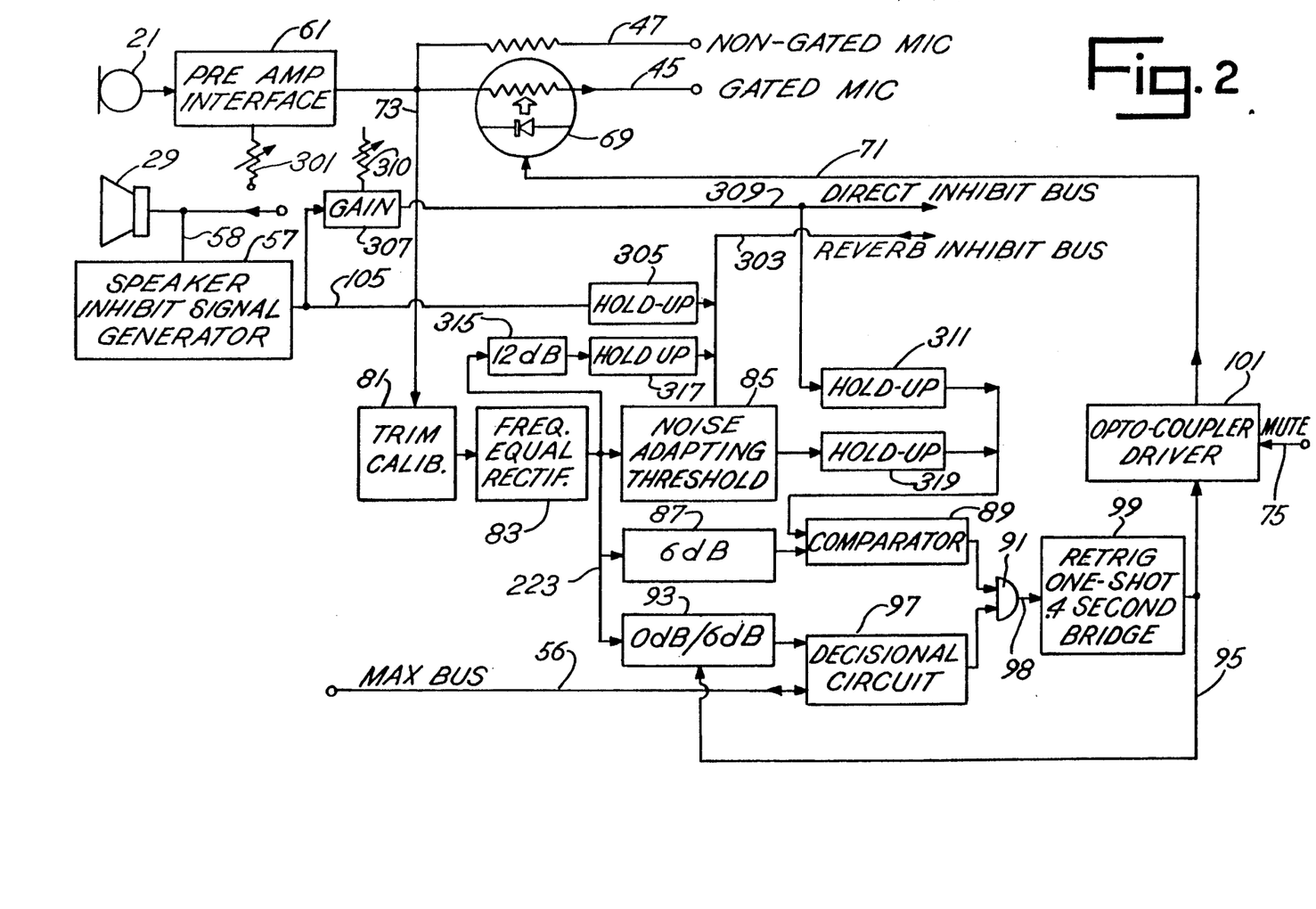
FIG. 2 is a block diagram of the preferred embodiment shown in FIG. 1.

In FIGS. 1 and 2, the MAX bus is represented as a line 56 interconnected to the decisional circuitry 97. At any single point in time, the signal on the MAX bus equals one value: the maximum of all of the scaled microphone signal level representations.

Thus, for example, assume that there are three microphones in a room (numbered 21, 23, and 25) and a different person, or talker, for each microphone. See FIG. 1. Assume that Talker 1 is talking into Microphone 21, that Talker 2 is adjacent Microphone 23, and that Talker 3 is adjacent Microphone 25. At some point, the level representation for Microphone 21 is the highest, or maximum, of any of the three microphone level representations. Thus, the level representation for Microphone 21 is on the MAX bus. If the microphone signal is also louder than the background noise, what is effectively and AND gate 91 will issue a trigger pulse for Microphone 21, and the one shot 99 associated with Microphone 21 will keep Microphone 21 gated ON for the next .4 second. If Talker 1 keeps talking, Microphone 21's level representation will continue to be carried by the MAX bus, and Microphone 21 will stay gated ON.

Talker 2 may begin speaking simultaneously with Talker 1. When Talker 1's voice briefly drops (for example, between words or syllables) Microphone 23's scaled signal level representation may then be the largest of all the scaled microphone level representations, and it will then be carried by the MAX bus. Accordingly, if, again, the signal from Microphone 23 is larger than the background noise, a trigger circuit will be generated, and Microphone 23's associated one shot 99 will keep Microphone 23 gated ON for the next .4 second.

Similarly, within the next few tenths of a second, Talker 2's voice is likely to drop briefly, and, if Talker 1 is still talking, Microphone 21's scaled level representation is likely to once again be carried on the MAX bus, such that Microphone 21 is gated ON for another .4 second. Even if Microphone 25 is moderately actuated by the sound of the voices of Talkers 1 or 2, it will never assume the role of causing the scaled maximum signal level representation and, thus, will never be gated ON, since Microphones 21 and 23 are picking up Talkers 1 and 2 more strongly.

The 6 dB advantage given to ON microphones in the MAX bus comparison usually, but not always, prevents the room reverberation of the talkers' voices, which addresses each microphone roughly equally, from resulting in gating triggers for any microphone that is not already ON. As described in the previous Julstrom patent, the net result of the MAX bus action is that only the single most appropriate microphone gates ON for an individual talker, but multiple microphones may gate ON for multiple talkers.

In order to assist the reader with a more complete understanding of the invention of the previous Julstrom patent (and the improvements of the present invention), portions of the patent are set forth below. The portions relate generally to FIGS. 1 and 2 of the present disclosure and discuss the operation of the MAX bus and related circuitry:

[M]ike/speaker circuitry 41 includes gating circuitry 50 comprised of three like mike gating circuits 51, 53, 55, associated with a respective microphone 21, 23, 25. A conventional power amplifier 59 responds to the [teleconference system's] speaker signal . . . appearing on conductor 49 and generates a similar signal on a conductor 58 of sufficient power level to drive loudspeaker 29. An inhibit signal generat[or] 57 receives the loudspeaker drive signal along conductor 58 and responsively generates an inhibit signal to each gating circuit 51-55. Each gating circuit 51-55 is alike in structure and one will be described . . . A MAX bus conductor 56 interconnects the mike gating circuits, but need not connect to control circuitry 43 . . . .

[M]icrophone 21 is electrically connected to a preamplifier/interface circuit 61. After preamplification, the microphone signal is output as a nongated microphone signal along conductor 47 and gated through an opto coupler switch 69 for output as a gated microphone signal along conductor 45.

The remaining circuitry . . . controls the gating of opto coupler switch 69 by generation of an opto coupler control signal along a conductor 71 to the opto coupler switch. The signal on conductor 71 is developed in accordance with (1) the preamplified microphone signal of its associated microphone (appearing on a conductor 73), (2) a signal related to the other microphones (appearing on MAX bus 56) (3) the loudspeaker drive signal (appearing on conductor 58) and (4) a mute logic signal (appearing on conductor 75).

The microphone signal on conductor 73 enters a trim calibration circuit 81. Circuit 81 is utilized to calibrate its associated mike gating circuit 51 . . . so that each of the three mike/gating circuits 51-55 functions identically in its comparison analysis, as will be understood.

The microphone signal is then fed to a frequency equalization/rectification circuit 83 which frequency equalizes the audio signal. Low frequencies, and to a lesser extent high frequencies, are reduced in level relative to mid frequencies. Circuitry 83 also serves to precision full wave rectify the audio signal and filter the resultant. The output of circuitry 83 is a varying DC voltage level signal which carries information of the amplitude and time of occurrence of speech as well as noise in the room as picked up by the associated microphone 21.

The output of circuitry 83 is fed to a noise adapting threshold circuit 85 which generates a threshold voltage level representative of room noise in the vicinity of the microphone 21. Circuitry 85 generates the threshold voltage level by effectively following the DC microphone signal using a very slow attack and immediate decay following. As the DC microphone level signal increases, a capacitor is slowly charged over a long RC time constant, and then as the DC microphone level signal is removed, the capacitor is quickly discharged at the same rate as the DC microphone level signal decrease. Because of the patterns of ordinary speech, the resulting voltage appearing on the capacitor is representative of noise in the room. The noise adaptive threshold voltage will adapt to steady background room noise which does not go below a certain level. Normal speech will not significantly charge the capacitor, which will continually discharge to the background noise level during even very brief pauses in speech.

The DC microphone output of circuitry 83 is also fed to an attenuator circuit 87 where the DC microphone signal is attenuated by 6 dB (a factor of 2). [In the previous Julstrom patent,] [t]he output of attenuator circuit 87 and the output of noise threshold circuit 85 are fed to a voltage comparator 89. Comparator 89 generates an output signal indicating when the rapidly fluctuating speech exceeds by 6 dB the threshold level representative of continuous noise in the room. Thus, the output of comparator 89 represents an independent decision with respect to one microphone that speech is occurring.

As understood, each microphone gating circuit 51, 53, 55 . . . will make a similar decision at its respective comparator 89 as speech from a single talker reaches each of the microphones 21, 23, 25. Since it is desired to limit the number of microphones gated ON for a single sound source, the output of comparator 89 is ANDed at 91 with a second decision signal for determining whether the associated microphone should be gated ON via opto coupler 69.

The second decisional process determines which of the microphones has received the loudest speech first. The MAX bus 56 receives inputs representative of the other microphone signals for use in the second decisional process. The MAX bus is connected to a decisional circuit 97 where the other microphone signals will be compared to the signal of the associated microphone 21.

The DC microphone signal from circuitry 83 is first attenuated by a 6 dB attenuator 93 prior to input to decisional circuit 97. Attenuator 93, however, is electrically actuable along a conductor 95 for removing the 6 dB attenuation when the microphone is gated ON. The output of the defeatable 6 dB attenuator 93 is connected to decisional circuitry 97 which compares it to the comparable signals in the other microphone circuits by way of the MAX bus interconnection for determining whether it is momentarily the maximum of all such comparable signals. The signal level on MAX bus 56 is controlled by decisional circuitry 97 and the comparable circuits associated with the other microphones to be equal to such maximum.

When both the noise adapting threshold criteria is satisfied (i.e., speech is occurring) and the MAX bus criteria is satisfied (i.e., the associated microphone 21 is momentarily receiving the loudest speech as slightly modified by the defeatable 6 dB attenuation of each microphone circuit), an output trigger signal is generated along a conductor 98 for actuating a retriggerable one shot 99. The output of one shot 99 actuates an opto coupler driver 101 which in turn drives opto coupler switch 69, gating the microphone signal of the associated microphone onto conductor 45. One shot 99 provides a 0.4 second hold time after each trigger on its input conductor 98. The output of one shot 99 is fed back to the control input of defeatable 6 dB attenuator 93 along conductor 95. Attenuator 93 responds to the HIGH signal from one shot 99, and removes the 6 dB attenuation.

The net result of the MAX bus interaction, as described above, is that a single talker gates on only one microphone, but a plurality of talkers speaking normally can reliably gate ON a plurality of microphones.

The loudspeaker 29, of course, will present speech signals to each of the microphone 21-25. In order to prevent gating of the microphone channels by speech from the loudspeaker, a speaker inhibit signal generator 57 is utilized. Generator 57 receives the loudspeaker drive signal 58 for responsively generating a speaker inhibit signal along a conductor 105. Generator 57 frequency equalizes, rectifies, and filters the loudspeaker driving signal for generating a DC output onto conductor 105.

Thus, in summary, the invention of the previous Julstrom patent includes a monitor. The monitor monitors the maximum of the microphone signal amplitudes of the microphone signals at one scaled level for microphone signals associated with gated ON microphones and at a different scaled level for microphone signals associated with gated OFF microphones. The monitor generates an electrical MAX signal on the MAX bus 56 representative of the maximum. The decisional circuit 97 in the monitor compares the scaled amplitude level of each microphone with the MAX signal for responsively generating a decision signal. The decision signal is inputted to the logical AND gate 91, which generates a trigger upon receiving a signal from the comparator 89 and decisional circuit 97. The trigger causes the one-shot 99 to issue a gating or trigger signal associated with a microphone to gate ON the associated microphone. In the preferred embodiment, the gating signal lasts for .4 second: a predetermined, minimal non-zero time duration. The opto-coupler, or gate, 101 is responsive to the gating signal for gating ON an associated microphone.

OVERVIEW

Following the actuation of the appropriate first microphone by the direct sound from a talker's speech, a reverberant trail of that speech distributes fairly evenly around the room, addressing all the microphones fairly uniformly. If all the microphones are operating at the same electroacoustic gain, then each microphone channel would address the MAX bus with about the same reverberant sound DC signal level representation, were it not for the 6 dB advantage given the already ON microphone.

Without the 6 dB advantage, random triggering of many microphone channels would result. With the 6 dB advantage, the already ON microphone continues to "win" on the MAX bus, preventing secondary microphone actuation. If, however, a second microphone is operated with roughly 6 dB or more additional electroacoustic gain over the initial microphone, then it may actuate from "winning" on the MAX bus after the direct speech has passed the initial microphone and reverberant room sound is dominant in the microphones' pickup.

To prevent this problem in the present invention, greater use is made of what was in the previous Julstrom patent the speaker inhibit signal input of each microphone channel's NAT circuitry. In the previous Julstrom patent, this input was fed from the speaker inhibit bus, which was a DC level representation of the predicted worst case coupling of loudspeaker sound (both direct and reverberant, but dominated by direct) into the microphones. This "bumped up" the NAT (which otherwise rises very slowly in response to microphone signals in order to adapt to room noise) sufficiently to inhibit microphone actuation for directly coupled loudspeaker sound. The NAT then rapidly fell back down to and followed the level of the microphone's DC level representation of the reverberant trail of the loudspeaker sound. Microphone actuation for this decaying reverberant trail was inhibited since, to initiate actuation according to the NAT circuit's criterion, the microphone's level representation after a 6 dB attenuation needed to overcome the NAT level, which was approximately equal to the unattenuated microphone's level representation during this reverberant trail. Thus, microphone actuation did not occur on the reverberant trail of a sound when actuation by the initial sound was inhibited through the NAT's inhibit input.

In the present invention, each microphone channel's NAT circuitry inhibit input is still used in the inhibition of microphone actuation by loudspeaker sound, although in a modified way, as will be discussed shortly. It is now fed, however, by a "Reverb Inhibit Bus." This is a "MAX bus-like" connection, which is the maximum of a modified speaker inhibit signal and 12 dB attenuated versions of all the microphone DC level representations. It is the contribution of these microphone level representations to the new Reverb Inhibit Bus which prevents secondary microphone actuation for reverberant sound by higher electroacoustic gain microphones.

A typical problem case can be examined which consists of a microphone at the front of a lecture hall which is being addressed closely by a strong talker and is therefore operated at a low relative electroacoustic gain, and microphones positioned above the audience to pick up weak questioners from a greater distance and therefore operated at a high relative electroacoustic gain. When the strong lecturer talks, the associated microphone channel actuates immediately as the direct sound to the microphone easily allows the channel to win on the MAX bus. The speech then reverberates around the hall, addressing all the microphones in the hall roughly equally. However, since audience microphones are operated at a higher electroacoustic gains, their reverberant sound pickup, and therefore their DC signal level representations of that pickup, are significantly higher than those of the lecturer's microphone. The 6 dB advantage on the MAX bus of the already ON lecturer's microphone may be overcome by the audience microphones, allowing one of them to actuate. (Generally a second audience microphone will not actuate since it does not have a significantly higher electroacoustic gain than the already ON audience microphone.)

The addition of the Reverb Inhibit Bus is needed to prevent an audience microphone from actuating. The DC signal level representation of the lecturer's direct speech is attenuated 12 dB (a factor of 4) and applied to the Reverb Inhibit Bus. This bumps up all the channels' NAT's to that same level, which is sufficient to inhibit audience microphone actuation for the initial reverberant buildup of the lecturer's speech. The inherent NAT circuit action inhibits actuation for the reverberant trail, as explained above. The 12 dB attenuation is sufficient to avoid bumping up the lecturer microphone channel's NAT so high as to cause problems in that microphone's proper actuation. (With the circuit values of the preferred embodiment of the previous Julstrom patent and the present invention, a channel's NAT circuit's adaptation time to a step increase in background noise level is reduced from about 7 seconds to about 4 seconds by the initial bump up of the NAT by the Reverb Inhibit Bus action.)

The degree of protection against unwanted reverberant sound actuation of a second microphone operated at higher electroacoustic gain may be approximated by assuming that the reverberant field is uniform at all microphone positions and that the level of the direct sound from the talker's voice reduces in inverse proportion to the distance from the talker (i.e. ½ the level, or down 6 dB, for a doubling of the distance). The critical distance (CD) in the room is the distance from the talker to a point in the room where the direct speech level and the reverberant level (as measured by an omni-directional microphone) are equal. Miking distance (MD) is defined here as the distance from the talker's microphone to the talker. The ratio of the reverberant sound picked up by each of the microphones to the direct sound picked up by the talker's microphone is, therefore, given by CD/MD.

The direct sound level representation is attenuated 12 dB (¼) before being applied to the Reverb Inhibit Bus to bump up all the channels' NAT's. This must be a sufficient level to prevent higher electroacoustic gain microphone's NAT's from triggering in response to the initial, strongest reverberation at those microphones. Those microphones (assuming they are cardioid, perhaps surface-mounted) pick up roughly ½ the level of reverberation of an omnidirectional microphone. Also, their DC level representations are attenuated 6 dB (½) before being compared to the NAT to determine microphone triggering. Taking all these factors into account, the electroacoustic gain advantage (GA) which the Reverb Inhibit Bus can guard against is roughly given by:

$$GA < CD/MD \times \frac{1}{2} \times 2 \times 2 = CD/MD$$

If the lecturer's microphone is placed ¼ of the critical distance away, then the audience microphones may be operated at up to 4×(12 dB higher) electroacoustic gain. With the miking and critical distances and gain settings found in typical problem applications, this is usually quite adequate protection.

In the previous Julstrom patent, actuation of microphones by teleconference loudspeaker sound was prevented by the action of the speaker inhibit circuitry and its interaction with the NAT circuitry, as described above and in the previous Julstrom patent. This allowed effective microphone actuation inhibition for both the directly coupled loudspeaker sound and the reverberation of that sound. The reverberation inhibition was achieved with an inherent adaptation to the actual amount and decay of reverberation present without having to employ a fixed protection against some assumed worst case reverberation. This latter course would have meant an inhibition signal with a stronger and longer decay rate and a significantly worsened ability to effect desired microphone actuation for local conference room speech in the presence of strongly coupled loudspeaker sound (which necessitates a high inhibition signal level).

Still, the circuitry had some significant effect in allowing strongly coupled loudspeaker sound to inhibit desired microphone actuation. To minimize this, it is important for the microphone DC level representation and the speaker inhibit signal, which is the DC level representation of the predicted worst-case loudspeaker-to-microphone coupling, to have as rapid envelope filter time constants as practical (11 milliseconds in this case). This results in higher peak-to-average and average-to-dip ratios in the level representations and causes peaks and dips to occur more often. Accordingly, there is more opportunity for occasional peaks in a microphone signal level representation to overcome (by 6 dB, due to the scaling in the NAT circuit) a speaker inhibit signal with, perhaps, a much larger average level and trigger microphone actuation (which has the triggers extended, approximately, by a ½ second hold time).

In situations with close loudspeaker-microphone placement and strong coupling, the speaker inhibit signal was forced to be scaled to a high level. Its inhibiting effect on desired microphone actuation was exaggerated because of its interaction with the NAT circuitry. The ability of a microphone signal level representation peak (representing a momentary peak in local room speech) to break through during a dip in the speaker inhibit signal and trigger microphone actuation was reduced significantly by the NAT circuitry interaction.

As the speaker inhibit signal fell towards a dip, the NAT would follow until it equalled the microphone signal level representation. The microphone signal level representation, which is attenuated 6 dB before being compared to the NAT, would have to rise 6 dB from what its level was when it crossed the falling speaker inhibit signal before it could cause an actuation trigger. This was significantly less likely to occur than a simple crossover of the microphone signal level representation and the speaker inhibit signal.

In the present invention, advantage is taken of the fact that the high degree of direct loudspeaker-to-microphone coupling occurring with close loudspeaker-microphone placement does not imply a correspondingly high degree of reverberant loudspeaker sound reaching the microphone. The speaker inhibit signal is split into two differently scaled versions. The version with the same scaling as the previous speaker inhibit signal, sufficient to inhibit microphone actuation for the strong directly coupled loudspeaker sound, drives a new Direct Inhibit Bus, which feeds each microphone channel. This direct inhibit signal is typically scaled in proportion to the teleconference system's acoustic feedback suppression setting. This setting determines the amount of attenuation placed alternately in the microphone or loudspeaker signal paths to maintain feedback stability and is determined by the amount of loudspeaker-microphone acoustic coupling. See U.S. Pat. No. 4,712,231, issued to Stephen D. Julstrom, at column 4, lines 4–60 and column 8, line 53 to column 9, line 8.

The second version of the speaker inhibit signal is typically scaled lower than the first by the acoustic suppression setting and typically, therefore, has a constant scaling independent of the suppression setting. Its scaling is based on assumed worst case room reverberation characteristics and system signal levels. For close loudspeaker-microphone placement, such as found in the preferred embodiment teleconference system of the previous Julstrom patent, the scaling of the two versions of the speaker inhibit signal may differ by up to about 20 dB (10×).

This second version is applied to the new Reverb Inhibit Bus, and, thus, to the NAT circuitry in the same manner as the previous speaker inhibit signal. However, now only a sufficient inhibit level is applied to inhibit microphone actuation for the initial loudspeaker reverberation (the reverberant trail is inhibited as discussed above by the NAT circuitry action) instead of the possibly much higher level needed for direct loudspeaker sound inhibition.

The inhibition of desired microphone actuation for conference room speech due to the action of the NAT circuitry is now low due to the greatly reduced speaker inhibit signal version which it receives. The maximum of the NAT signal and the direct inhibit bus signal is now taken in place of the NAT signal alone in the NAT circuitry comparator to determine, in conjunction with the MAX bus circuitry, the generation of a microphone actuation trigger.

The inhibiting effect on desired microphone actuation of the larger direct inhibit bus signal (with the same level as the previous speaker inhibit signal) is much less because the interaction with the NAT circuitry is avoided, and dips in its level are fully available for microphone signal level representation peaks to break through. The net effect is significantly reduced inhibition of desired microphone actuation by the speaker inhibit circuitry in systems with a high degree of loudspeaker-microphone acoustic coupling.

It should also be recognized that the circuitry of the present invention is equally useful in obtaining local speech detection, necessary for several uses, in teleconference systems. In a single microphone system, a "microphone actuation" trigger signal, without the need of the MAX bus circuitry, represents local speech detection. Such a "microphone channel" circuit can also be applied to the combined, mixed output of a multiple microphone system, whether automatically controlled or not, to effect local speech detection. Alternately in an automatically controlled multiple microphone system of the type of the present invention, the local speech detection signal may be taken as a logical OR of all the channels' microphone actuation trigger signals.

DETAILED DESCRIPTION OF THE ENHANCEMENTS AND REFINEMENTS TO THE PRIOR SYSTEM

Referring to FIG. 2, a block diagram of improved microphone channel and the speaker inhibit circuitry of the present invention is shown. FIG. 2 is related to FIG. 6 of the previous Julstrom patent; however, new elements (designated below with the numbers 301–321) have been added.

A variable resistor symbol 301 is attached to microphone pre-amp interface 61 to indicate that the gain of the pre-amp for each microphone channel may be varied by the user/system installer to suit special needs, such as the lecturer/audience microphone example discussed above. Any number of methods well-known in the art may used to accomplish this.

The speaker inhibit signal generator 57 is shown being driven directly by loudspeaker drive signal 58. It is evident that, with appropriate gain scaling in the generator 57, the drive could be obtained prior to the loudspeaker power amplifier 59 (shown in FIG. 1). For example, the drive may be taken from the conductor 49.

The generator 57 now produces a typically lower level of inhibition signal on the conductor 105 than in the previous Julstrom patent, sufficient to inhibit microphone actuation for reverberant loudspeaker sound, as discussed above. This feeds a Reverb Inhibit Bus 303 through a hold-up circuit 305. The term "hold up" is used herein to describe a circuit whose output will define the signal on a particular bus or conductor, if its input is the maximum of all other inputs to all the other hold up circuits outputting to that bus or conductor.

The output of the generator 57 on conductor 105 also feeds variable gain stage 307, whose gain is symbolically varied by variable resistor 310. The gain stage may be achieved by any number of methods well-known in the art. Rather than making the gain adjustment a specific user-variable control, the adjustment is more advantageously made to follow the acoustic feedback suppression adjustment of the teleconference system, as this represents the acoustic coupling from loudspeaker to microphone, as discussed above. The output of the gain stage 307 is the Direct Inhibit Bus 309. The Direct Inhibit Bus 309 drives the comparator 89 through a hold-up circuit 311.

As a variation, the gain stage 307 may take its input directly from the conductor 58, and then be followed by an additional speaker inhibit signal generator identical to the generator 57, to produce a signal on the Direct Inhibit Bus 309. This rearrangement may be advantageous in practice to avoid amplifying DC offset errors appearing at the output of the generator 57 which could interfere with low level performance of the system.

The loudspeaker 29, MAX bus conductor 56, inhibit signal generator 57, conductor 58, conductor 105, Reverb Inhibit Bus 303, hold up circuit 305, gain stage 307, Direct Inhibit Bus 309, and variable resistor 310 are common to the entire multiple microphone system. The other elements shown in FIG. 2 are present individually in each microphone channel.

The frequency equalized rectifier 83 produces the channel's DC microphone signal level representation on the conductor 223. This signal is attenuated 12 dB in an attenuator 315, whose output signal is applied to Reverb Inhibit Bus 303 through a hold-up circuit 317.

The hold-up circuits 305 and 317 are similar to MAX bus decisional circuit 97 in that the DC signal level appearing on Reverb Inhibit Bus 303 is the maximum of the signal on conductor 105 and all the outputs of all the microphone channels' 12 dB attenuators 315. The Reverb Inhibit Bus 303 drives the inhibit inputs of all the channels' Noise Adapting Threshold circuits 85 to achieve inhibition of microphone actuation for reverberant loudspeaker sound and of secondary actuation of higher electroacoustic gain microphones from the reverberation of conference room speech, as discussed above.

The output of the Noise Adapting Threshold circuit 85 is now applied to the comparator 89 through a hold-up circuit 319. The hold-up circuits 311 and 319 are again a "MAX bus type" connection, where their combined output is the maximum of the signal on the Direct Inhibit Bus 309 and the channel's noise adapting threshold 85. The DC microphone signal level representation, attenuated by 6 dB through attenuator 87, must overcome the signal on the output of noise adapting threshold 85 or Direct Inhibit Bus 309, whichever is greater. The Noise Adapting Threshold circuit 85 inhibits microphone actuation for background room noise and trailing reverberant sounds, while Direct Inhibit Bus 309 inhibits microphone actuation for directly coupled loudspeaker sound.

Thus, the threshold signal issuing from the NAT circuitry 85 follows the microphone level representation, which has a slow rise time and substantially immediate fall time characteristic, when the reverb inhibit signal is below both the microphone level representation and threshold signal. (As mentioned previously, the rise time is "slow," since NAT circuit's adaptation time to a step increase in background noise, in the preferred embodiment is about 4 seconds. Adaptation times of 2 or 3 seconds may also, of course, be considered slow in the context of the present invention.) When the reverb inhibit signal is not below both the microphone level representation and threshold signal, however, the threshold signal follows the reverb inhibit signal, which has a substantially immediate rise and fall time characteristic.

Figure 3:
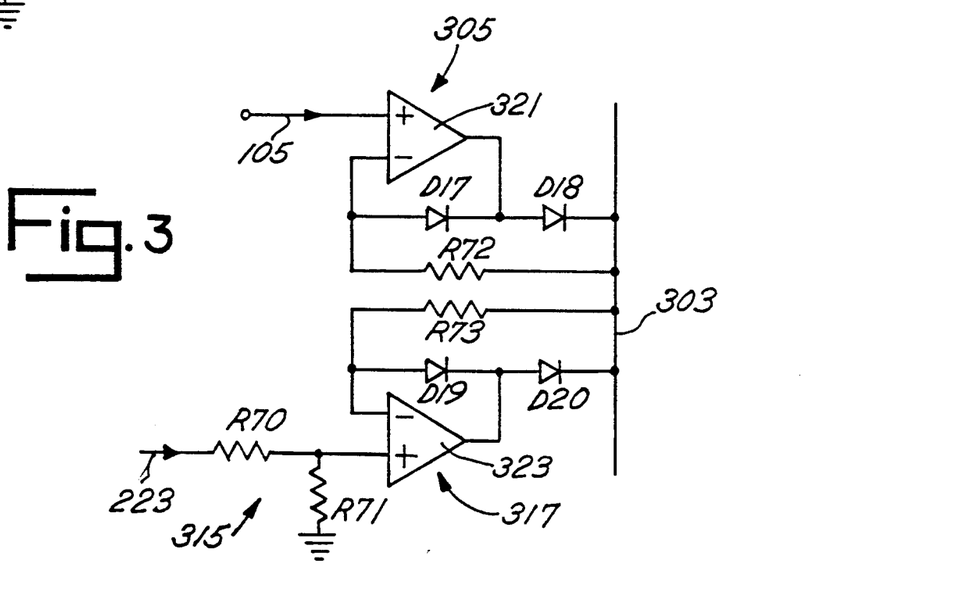
FIG. 3 is a schematic diagram of the Reverb Inhibit Bus drive circuitry used in the embodiment shown in FIG. 2.

FIG. 3 shows a detailed schematic diagram of the 12 dB attenuator 315 and hold-up circuits 305 and 317 driving the Reverb Inhibit Bus 303. The signal level on the Reverb Inhibit Bus 303 is equal to the higher of the signals on the positive inputs of the operational amplifiers 321, 323. The circuit operation is like the MAX bus drive portion of the decisional circuit 97 of FIG. 2, which is described in the previous Julstrom patent.

Figure 4:
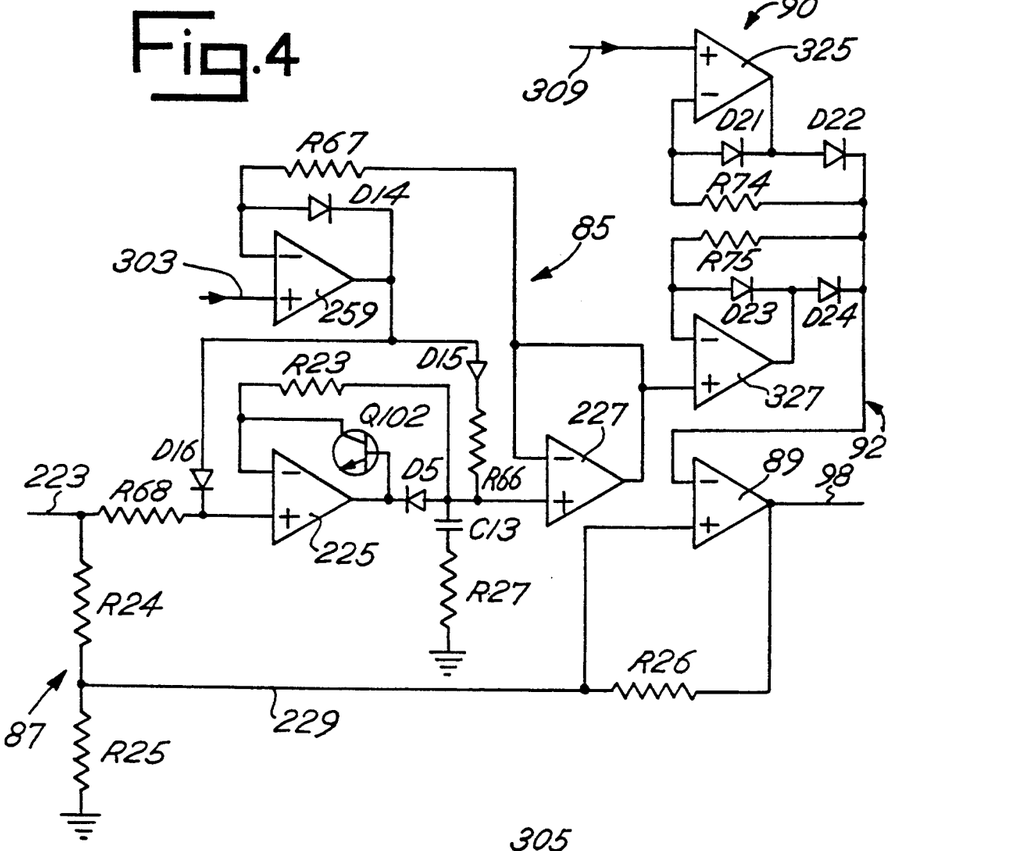
FIG. 4 is a schematic diagram of the Noise Adapting Threshold circuitry and associated inhibit circuitry used in the embodiment shown in FIG. 2.

FIG. 4 shows a detailed schematic diagram of the noise adapting threshold circuitry and associated inhibit circuitry. This is a modification of FIG. 10 of the previous Julstrom patent.

To again assist the reader in understanding the structure and operation of the present invention, portions of the previous Julstrom patent that concern the NAT circuitry and associated inhibit circuitry are set forth below:

[N]oise adapting threshold circuit 85 is illustrated in more detail. The signal appearing on conductor 223 is a linear amplitude representation of the frequency equalized microphone signal. This amplitude representation is compared with a voltage appearing on a capacitor C13 which represents room noise. The signal appearing on conductor 223 is applied to the noninverting input of a field effect transistor input operational amplifier 225 through resistor R68. As the signal at the noninverting input changes, capacitor C13 is charged and discharged accordingly. Resistor R27 is of a low value which is used to aid the stability of operational amplifier 225 and may be neglected in the circuit analysis. Transistor Q102 is interconnected between the output and the inverting input of operational amplifier 225 and is used as a low leakage current diode.

When the noninverting input of op amp 225 is higher in voltage than the capacitor voltage, then op amp 225 holds its inverting input at the same voltage as its noninverting input through transistor Q102. Resistor R23 charges capacitor C13 slowly with a 10 second time constant. When the signal on the noninverting input of the operational amplifier attempts to go lower than the voltage on the capacitor, then op amp 225 discharges capacitor C13 through diode D5. The operational amplifier pulls down at an appropriate rate in accordance with the feedback voltage appearing at the inverting input through resistor R23, which has a negligible voltage drop across it due to the low input current of op amp 225 and the low leakage current of Q102. This makes discharge diode D5 appear as a precision diode.

Thus, the noise adaptive threshold voltage on capacitor C13 tracks the voltage on conductor 223 with a slow attack, immediate decay characteristic, seeking the lowest continuous background level.

The threshold voltage appearing on capacitor C13 is buffered by a unity gain field effect transistor input operational amplifier 227. The output of operational amplifier 227 provides a signal representative of room noise.

As shown in FIG. [4] 6 dB attenuator 87 is constructed by resistors R24, R25 which provide along conductor 229 a 6 dB modification of the input signal appearing on conductor 223. Comparator 89, which is formed from an open collector output LM339, receives the buffered output of the threshold voltage at its inverting input and receives the 6 dB attenuated signal at its noninverting input. A resistor R26 provides a small amount of hysteresis around comparator 89 for switching stability. Thus, the output of comparator 89 potentially provides a logic high signal along a conductor 98 indicating that speech is occurring at its associated microphone 21. Unlike the circuit of the previous Julstrom patent, the speaker inhibit input at the positive input of operational amplifier 259 is now fed by Reverb Inhibit Bus 303. Also, the output of noise adapting threshold circuit 85 appearing at the output of operational amplifier 227 no longer directly feeds the negative input of comparator 89. New elements (Diodes D21-D24, Resistors R74 and R75, Direct Inhibit Bus 309, and operational amplifiers 325 and 327) have been added to the circuit shown in the previous Julstrom patent. These elements present the higher of the noise adapting threshold circuit 85 output level appearing at the output of operational amplifier 227 and the Direct Inhibit Bus 309 level to the negative input of the comparator 89. Again, the circuit operation of these new elements is like the MAX bus drive portion of decisional circuit 97 of FIG. 2. See the previous Julstrom patent.

In FIGS. 3 and 4, diodes D17-D24 are general purpose switching diodes. Diode type 1N4148 or equivalents will work with the particular preferred embodiment shown. Operation amplifiers 321, 323, 325, and 327 are general purpose types. Texas Instruments TLO72 or equivalents will work with the particular preferred embodiment shown.

The following resistor values are given as working with the particular preferred embodiment shown:

| Resistors | Resistance |
| --- | --- |
| R70 | 100 kΩ |
| R71 | 33.2 kΩ |
| R72, R73, R74, R75 | 200 kΩ |

It should be understood, of course, that the foregoing description refers to a preferred embodiment of the invention and that modifications or alterations may be made therein without departing from the spirit or scope of the invention as set forth in the appended claims. Specifically, representation of the signals in the system in a digital rather than analog manner is well within the scope and spirit of the invention. Thus, for example, all electrical signals, including DC signal level representations, can be represented by digital numbers; the Direct Inhibit Bus, Reverb Inhibit Bus, and MAX bus may be represented by digital memory locations.

I claim:

1. A microphone system comprising:

a plurality of microphones, each of said microphones generating an electrical microphone signal carrying speech information; and a plurality of gating means cooperatively producing a MAX signal, for determining which of said plurality of microphones should be gated on for speech, and a reverb inhibit signal, for inhibiting microphones from gating on in response to reverberations of said speech, each of said gating means being associated with one of said microphones, each of said gating means receiving said microphone signal from said one of said microphones and gating said microphone signal to gate ON said associated microphone in response to a gating signal, said gating means including:

rectifier means for monitoring said microphone signal and responsively producing a microphone signal level representation of said microphone signal, scaling means for monitoring said microphone signal level representation of said microphone signal at first, second, and third scaled levels and responsively providing first, second, and third scaled microphone level representations, said third scaled microphone signal level representation being at one scaled level for microphone signals associated with gated ON microphones and at a different scaled level for microphone signals associated with gated OFF microphones;

first monitoring means for monitoring first scaled microphone signal level representations of said plurality of microphones and responsively providing said reverb inhibit signal representing a maximum of each of said first scaled microphone signal level representations;

threshold means for receiving said microphone signal level representation and said reverb inhibit signal and producing a threshold signal;

comparison means for comparing said second scaled level representation of each said microphone signal with each said threshold signal and responsively generating a compared signal;

second monitoring means for monitoring third scaled microphone signal level representations of said plurality of microphones and responsively generating said MAX signal representing a maximum of each of said third scaled microphone signal level representations, said second monitoring means comparing said third scaled amplitude level of each said microphone with said MAX signal for responsively generating a decision signal for said one of said microphones;

logic means for generating a trigger signal associated with said one of said microphones to gate ON said microphone upon receiving both said comparison and decision signals;

gating signal generation means responsive to said trigger signal for generating a gating signal of a predetermined, non-zero time duration for gating ON said one of said microphones associated with said trigger signal; and gate means, responsive to a said gating signal, for gating ON said one of said microphones.

2. A microphone system comprising:

a plurality of microphones, each of said microphones generating an electrical microphone signal carrying speech information; and a plurality of gating means cooperatively producing a MAX signal, for determining which of said plurality of microphones should be gated on for speech, and a reverb inhibit signal, for inhibiting microphones from gating on in response to reverberations of said speech, each of said gating means being associated with one of said microphones, each said gating means receiving said microphone signal from said one of said microphones and gating said microphone signal to gate ON said associated microphone in response to a gating signal, said gating means including:

rectifier means for monitoring said microphone signal and responsively producing a microphone signal level representation of said microphone signal, scaling means for monitoring said microphone signal level representation of said microphone signal at first, second, and third scaled levels and responsively providing first, second, and third scaled microphone signal level representations, said third scaled microphone signal level representation being at one scaled level for microphone signals associated with gated ON microphones and at a different scaled level for microphone signals associated with gated OFF microphones;

first monitoring means for monitoring first scaled microphone signal level representations of said plurality of microphones and responsively providing said reverb inhibit signal representing a maximum of each of said first scaled microphone signal level representations;

threshold means for receiving said microphone signal level representation and said reverb inhibit signal and producing a threshold signal, said threshold signal following said microphone level representation when said reverb inhibit signal is below both said microphone signal level representation and threshold signal, said threshold signal otherwise following said reverb inhibit signal;

comparison means for comparing said second scaled signal level representation of each said microphone signal with each said threshold signal and responsively generating a compared signal, whereby said compared signal is representative of speech within a room rather than reverberation of speech within said room that already has gated on a different microphone;

second monitoring means for monitoring third scaled microphone signal level representations of said plurality of microphones and responsively generating said MAX signal representing of a maximum of each of said third scaled microphone signal level representations, said second monitoring means comparing said third scaled amplitude level of each said microphone with said MAX signal for responsively generating a decision signal for said one of said microphones;

logic means for generating a trigger signal associated with said one of said microphones to gate ON said microphone upon receiving both said comparison and decision signals;

gating signal generation means responsive to said trigger signal for generating a gating signal of a predetermined, non-zero time duration for gating ON said one of said microphones associated with said trigger signal; and gate means, responsive to said gating signal, for gating ON said one of said microphones.

3. In a microphone system having at least one microphone for generating an electrical microphone signal carrying speech information, a source for issuing a loudspeaker signal, and loudspeaker means for generating sound in the area of said microphone, said loudspeaker means being driven by said loudspeaker signal, a trigger signal generator for identifying speech comprising:

rectifier means for monitoring said microphone signal and responsively providing a microphone signal level representation of said microphone signal;

scaling means for monitoring said microphone signal level representation of said microphone signal and responsively providing a scaled signal level representation;

monitoring means for monitoring said loudspeaker signal issued by said source and responsively producing a direct inhibit signal representing a scaled level of said loudspeaker signal and a loudspeaker reverb inhibit signal representing another scaled level of said loudspeaker signal;

threshold means for receiving said microphone signal level representation of said microphone signal and said loudspeaker reverb inhibit signal and producing a threshold signal; and comparison means for comparing said scaled microphone signal level representation of said microphone signal with a maximum of both said direct inhibit signal and threshold signal and responsively generating a trigger signal, whereby said trigger signal is generated when a signal is detected by said microphone that is representative of speech within a room.

4. In a microphone system having
at least one microphone for generating an electrical microphone signal carrying speech information,
a source for issuing a loudspeaker signal, and loudspeaker means for generating sound in the area of said microphone,
said loudspeaker means being driven by said loudspeaker signal,
a trigger signal generator for identifying speech comprising:
  rectifier means for monitoring said microphone signal and responsively providing a microphone signal level representation of said microphone signal;
  scaling means for monitoring said microphone signal level representation of said microphone signal and responsively providing a scaled microphone signal level representation;
  monitoring means for monitoring said loudspeaker signal issued by said source and responsively producing a direct inhibit signal representing a scaled level of said loudspeaker signal and a loudspeaker reverb inhibit signal representing another scaled level of said loudspeaker signal;
  threshold means for receiving said microphone level representation of said microphone signal and said landspeaker reverb inhibit signal and producing a threshold signal;
  comparison means for comparing said scaled microphone signal level representation of said microphone signal with a maximum of both said direct inhibit signal and threshold signal and responsively generating a compared signal; and
  logic means for receiving said compared signal and responsively generating a trigger signal,
  whereby said trigger signal is generated when a signal is detected by said microphone that is representative of speech within a room.

5. A microphone system as claimed in claim 4 wherein said monitoring means includes gain means for receiving and amplifying said loudspeaker reverb inhibit signal to produce said direct inhibit signal.

6. In a microphone system having
at least one microphone for generating an electrical microphone signal carrying speech information,
a source for issuing a loudspeaker signal, and
loudspeaker means for generating sound in the area of said microphone,
said loudspeaker means being driven by said loudspeaker signal,
a trigger signal generator for identifying speech comprising:
  rectifier means for monitoring said microphone signal and responsively providing a microphone signal level representation of said microphone signal;
  scaling means for monitoring said microphone signal level representation of said microphone signal and responsively providing a scaled microphone signal level representation;
  monitoring means for monitoring said loudspeaker signal issued by said source and responsively producing a direct inhibit signal representing a scaled level of said loudspeaker signal and a loudspeaker reverb inhibit signal representing another scaled level of said loudspeaker signal;
  threshold means for receiving said microphone signal level representation of said microphone signal and said loudspeaker reverb inhibit signal and producing a threshold signal, said threshold signal following said microphone signal level representation when said loudspeaker reverb inhibit signal is below both said microphone signal level representation and threshold signal, said threshold signal otherwise following said loudspeaker reverb inhibit signal;
  comparison means for comparing said scaled microphone signal level representation of said microphone signal with a maximum of both said direct inhibit signal and threshold signal and responsively generating a compared signal; and
  logic means for generating a trigger signal upon receiving said comparison signal, whereby said trigger signal generator issues said trigger signal when a signal is detected that is representative of speech within a room, rather than direct or reverberant loudspeaker sound.

7. A microphone system as claimed in claim 6 wherein said monitoring means includes gain means for receiving and amplifying said loudspeaker reverb inhibit signal to produce said direct inhibit signal.

8. A microphone system comprising:
at least one microphone for generating an electrical microphone signal carrying speech information;
a source for issuing a loudspeaker signal;
loudspeaker means for generating sound in the area of said microphone, said loudspeaker means being driven by said loudspeaker signal; and
gating means associated with said microphone, said gating means receiving said microphone signal from said microphone and gating said microphone signal to gate ON said associated microphone in response to a gating signal, said gating means including:
  rectifier means for monitoring said microphone signal and responsively producing a microphone signal level representation of said microphone signal;
  scaling means for monitoring said microphone signal level representation of said microphone signal and responsively providing a scaled microphone signal level representation;
  monitoring means for monitoring said loudspeaker signal and responsively producing a direct inhibit signal representing a scaled level of said loudspeaker signal and a loudspeaker reverb inhibit signal representing another scaled level of said loudspeaker signal;
  threshold means for receiving said microphone signal level representation and said loudspeaker reverb inhibit signal and producing a threshold signal;
  comparison means for comparing said scaled microphone signal level representation of said microphone signal with a maximum of both said direct inhibit signal and threshold signal and responsively generating a trigger signal associated with said microphone to gate ON said microphone;
  gating signal generation means, responsive to a said trigger signal, for generating a gating signal of a predetermined, non-zero time duration for gating ON said microphone; and gate means, responsive to said gating signal, for gating ON said microphone.

9. A microphone system as claimed in claim 8 wherein said monitoring means includes gain means for receiving and amplifying said loudspeaker reverb inhibit signal to produce said direct inhibit signal.

10. A microphone system comprising:

at least one microphone for generating an electrical microphone signal carrying speech information;

a source for issuing a loudspeaker signal;

loudspeaker means for generating sound in the area of said microphone, said loudspeaker means being driven by said loudspeaker signal; and gating means associated with said microphone, said gating means receiving said microphone signal from said microphone and gating said microphone signal to gate ON said associated microphone in response to a gating signal, said gating means including:

rectifier means for monitoring said microphone signal and responsively providing a microphone signal level representation of said microphone signal;

scaling means for monitoring said microphone signal level representation of said microphone signal and responsively providing a scaled microphone signal level representation;

monitoring means for monitoring said loudspeaker signal issued by said source and responsively producing a direct inhibit signal representing a scaled level of said loudspeaker signal and a loudspeaker reverb inhibit signal representing another scaled level of said loudspeaker signal;

threshold means for receiving said microphone signal level representation and said loudspeaker reverb inhibit signal and producing a threshold signal, said threshold signal following said microphone signal level representation when said loudspeaker reverb inhibit signal is below both said microphone signal level representation and threshold signal, said threshold signal otherwise following said loudspeaker reverb inhibit signal;

comparison means for comparing said scaled microphone signal level representation of said microphone signal with a maximum of both said direct inhibit signal and threshold signal and responsively generating a compared signal, whereby said compared signal is representative of speech within a room rather than direct or reverberant loudspeaker sound;

logic means for generating a trigger signal associated with said microphone to gate ON said microphone upon receiving said comparison signal;

gating signal generation means, responsive to said trigger signal, for generating a gating signal of a predetermined non-zero time duration for gating ON said microphone associated with said trigger signal; and gate means, responsive to a said gating signal, for gating ON said microphone.

11. A microphone system as claimed in claim 10 wherein said monitoring means includes gain means for receiving and amplifying said loudspeaker reverb inhibit signal to produce said direct inhibit signal.

12. A microphone system comprising:

a plurality of microphones, each of said microphones generating an electrical microphone signal carrying speech information; and a source for issuing a loudspeaker signal;

loudspeaker means for generating sound in the area of said microphones, said loudspeaker means being driven by said loudspeaker signal;

first monitoring means for monitoring said loudspeaker signal and responsively producing a direct inhibit signal representing a scaled level of said loudspeaker signal and a loudspeaker reverb inhibit signal representing another scaled level of said loudspeaker signal; and a plurality of gating means, each of said gating means being associated with one of said microphones, each said gating means receiving said microphone signal from said one of said microphones and gating said microphone signal to gate ON said associated microphone in response to a gating signal, said gating means including:

rectifier means for monitoring said microphone signal and responsively providing a microphone signal level representation of said microphone signal;

scaling means for monitoring said microphone signal level representation of said microphone signal at first, second, and third scaled levels and responsively providing first, second, and third scaled microphone signal level representations, said third scaled microphone signal level representation being at one scaled level for microphone signals associated with gated ON microphones and at a different scaled level for microphone signals associated with gated OFF microphones;

second monitoring means for monitoring said loudspeaker reverb inhibit signal and first scaled microphone signal level representations of said plurality of microphone and responsively providing a reverb inhibit signal representing a maximum of said loudspeaker reverb inhibit signal and each of said first scaled microphone signal level representations;

threshold means for receiving said microphone signal level representation and said reverb inhibit signal and producing a threshold signal, said threshold signal following said microphone signal level representation when said reverb inhibit signal is below both said microphone signal level representation and threshold signal, said threshold signal otherwise following said reverb inhibit signal;

comparison means for comparing said second scaled signal level representation of each said microphone signal with a maximum of both said direct inhibit signal and said threshold signal and responsively generating a compared signal;

third monitoring means for monitoring third scaled microphone signal level representations of said plurality of microphones and responsively generating a MAX signal representative of a maximum of each of said third scaled microphone signal level representations, said third monitoring means comparing said third scaled amplitude level of each said microphone with said MAX signal for responsively generating a decision signal for said one of said microphones;

logic means for generating a trigger signal associated with said one of said microphones to gate ON said microphone upon receiving both said comparison and decision signals;

gating signal generation means responsive to said trigger signal for generating a gating signal of a predetermined, non-zero time duration for gating ON said one of said microphones associated with said trigger signal; and gate means, responsive to a said gating signal, for gating ON said one of said microphones.

13. A microphone system as claimed in claim 12 wherein said first monitoring means includes gain means for receiving and amplifying said loudspeaker reverb inhibit signal to produce said direct inhibit signal.

14. A microphone system comprising:

a plurality of microphones, each of said microphones generating an electrical microphone signal carrying speech information; and a source for issuing a loudspeaker signal;

loudspeaker means for generating sound in the area of said microphones, said loudspeaker means being driven by said loudspeaker signal;

first monitoring means for monitoring said loudspeaker signal and responsively producing a loudspeaker reverb inhibit signal representing a scaled level of said loudspeaker signal;

gain means for amplifying said loudspeaker reverb inhibit signal to produce a direct inhibit signal representing another scaled level of said loudspeaker signal; and a plurality of gating means each of said gating means being associated with one of said microphones, each said gating means receiving said microphone signal from said one of said microphones and gating said microphone signal to gate ON said associated microphone in response to a gating signal, said gating means including:

rectifier means for monitoring said microphone signal and responsively producing a microphone signal level representation of said microphone signal;

scaling means for monitoring said microphone signal level representation of said microphone signal at first, second, and third scaled levels and responsively providing first, second, and third scaled microphone signal level representations, said third scaled microphone signal level representation being at one scaled level for microphone signals associated with gated ON microphones and at a different scaled level for microphone signals associated with gated OFF microphones;

second monitoring means for monitoring said loudspeaker reverb inhibit signal and first scaled microphone signal level representations of said plurality of microphones and responsively providing a reverb inhibit signal representing a maximum of said loudspeaker reverb inhibit signal and each of said first scaled microphone signal level representations;

threshold means for receiving a microphone signal level representation and said reverb inhibit signal and producing a threshold signal, said threshold signal following said microphone signal level representation, with a slow rise and substantially immediate fall characteristic, when said reverb inhibit signal is below both said microphone signal level representation and threshold signal, said threshold signal otherwise following said reverb inhibit signal, with a substantially immediate rise and fall characteristic;

comparison means for comparing said second scaled signal level representation of each said microphone signal with a maximum of both said direct inhibit signal and each said threshold signal and responsively generating a compared signal, whereby said compared signal is representative of speech within a room rather than direct or reverberant loudspeaker sound or the reverberation of speech within said room that already has gated on a different microphone;

third monitoring means for monitoring third scaled microphone signal level representations of said plurality of microphones and responsively generating a MAX signal representing of a maximum of each of said third scaled microphone signal level representations, said third monitoring means comparing said third scaled amplitude level of each said microphone with said MAX signal for responsively generating a decision signal for said one of said microphones;

logic means for generating a trigger signal associated with said one of said microphones to gate ON said microphone upon receiving both said comparison and decision signals;

gating signal generation means responsive to said trigger signal for generating a gating signal of a predetermined, non-zero time duration for gating ON said one of said microphones associated with said trigger signal; and gate means, responsive to a said gating signal, for gating ON said one of said microphones.

* * * * *